United States Patent [19]
Brown

[11] Patent Number: 5,784,068
[45] Date of Patent: Jul. 21, 1998

[54] METHOD FOR DRAWING AN ELEMENT OF AN OBJECT DURING COMPUTER-AIDED DRAFTING OF THE OBJECT

[75] Inventor: Robert J. Brown, Exton, Pa.

[73] Assignee: Bentley Systems, Incorporated, Exton, Pa.

[21] Appl. No.: 725,391

[22] Filed: Oct. 3, 1996

Related U.S. Application Data

[60] Provisional application No. 60/004,915 Oct. 6, 1995 and provisional application No. 60/005,484 Oct. 6, 1995.

[51] Int. Cl.$^6$ .................................................. G06F 15/00
[52] U.S. Cl. ........................................................ 345/441
[58] Field of Search ............................... 345/440, 441, 345/442, 443, 117, 121

[56] References Cited

U.S. PATENT DOCUMENTS

| | | | |
|---|---|---|---|
| 5,325,476 | 6/1994 | Takii et al. | 345/441 |
| 5,659,639 | 8/1997 | Mahoney et al. | 345/440 |

*Primary Examiner*—Phu K. Nguyen
*Attorney, Agent, or Firm*—Panitch Schwarze Jacobs & Nadel, P.C.

[57] ABSTRACT

A method for drawing an element of an object during computer-aided drafting of the object is disclosed. A computer has a view screen displaying a cursor and at least a portion of a drawing field, and also has a cursor manipulator. The cursor is positioned using the cursor manipulator at a first location on the drawing field, a first data point is recorded at the first location, and the first data point is displayed on the view screen. A drawing plane is associated with the first data point and has first and second substantially perpendicular axes, and an origin at the intersection thereof coinciding with the first data point. The cursor is then positioned using the cursor manipulator at a second location on the drawing field relative to the origin of the drawing plane, a second data point is recorded at the second location, and the second data point is displayed on the view screen. At least a portion of the element is displayed on the view screen, where the element is at least partially defined by the first data point and the second data point.

15 Claims, 3 Drawing Sheets

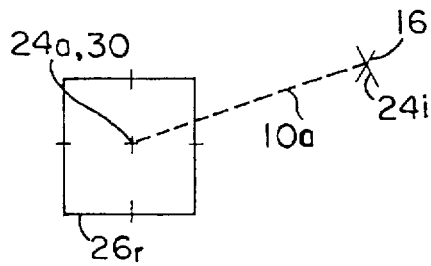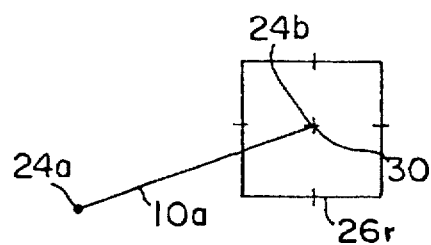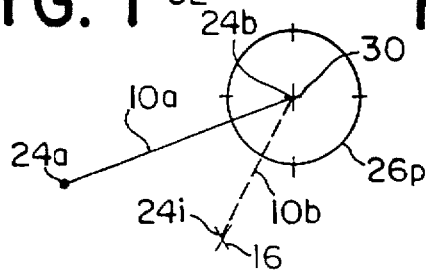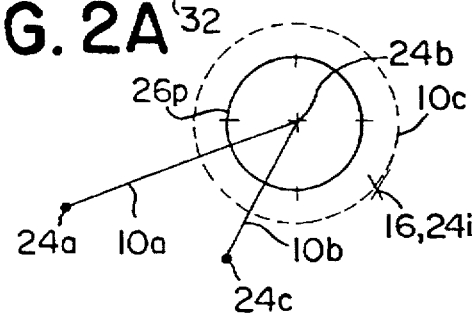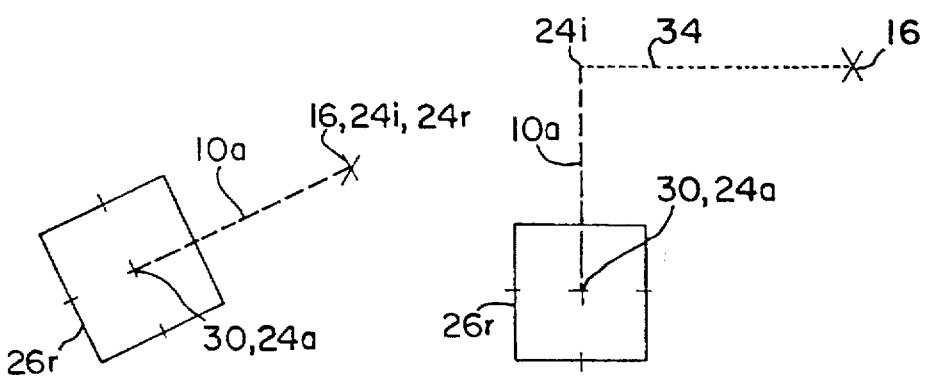

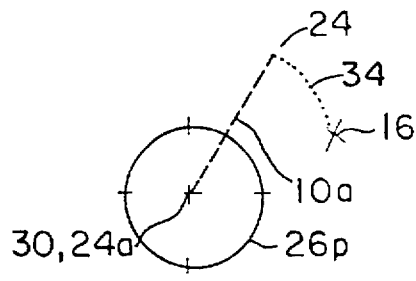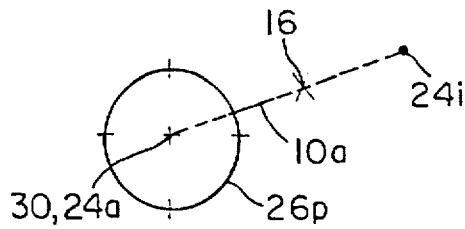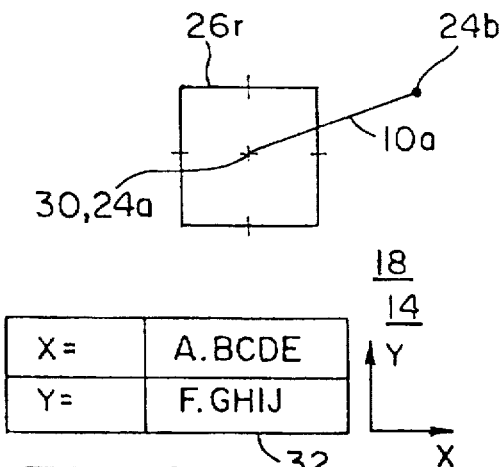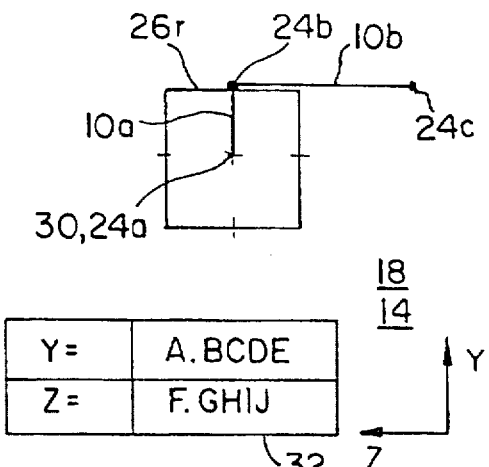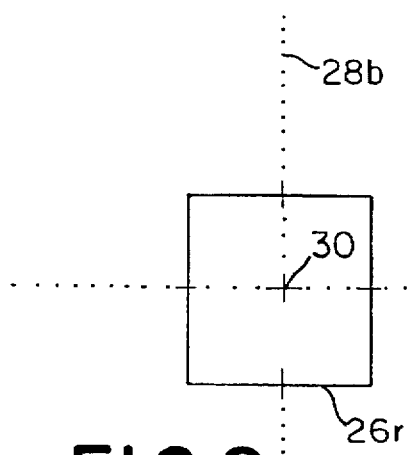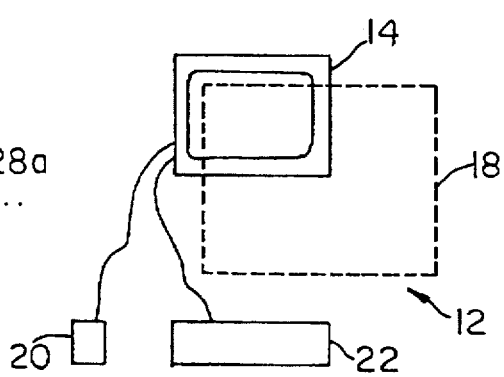

METHOD FOR DRAWING AN ELEMENT OF AN OBJECT DURING COMPUTER-AIDED DRAFTING OF THE OBJECT

CROSS-REFERENCE TO RELATED APPLICATIONS

This application claims the benefit of U.S. Provisional applications Ser. Nos. 60/004,915 and 60/005,484, both filed Oct. 6, 1995.

FIELD Of THE INVENTION

The present invention relates generally to a method for drawing an element of an object during computer-aided drafting of the object. More particularly, the present invention relates to such a method where a movable drawing plane is employed to draw the element.

BACKGROUND OF THE INVENTION

As is known, in computer-aided drafting, a draftsperson typically employs a computer system having an installed computer-aided drafting software system ("drafting system"), and draws an object on a computer view screen associated with the computer system. Typically, the drafting system employs a cursor on the computer view screen to depict a current position on a drawing field, and a draftsperson uses a cursor manipulator such as a computer mouse, joystick, or the like, to manipulate the cursor on the computer view screen and drawing field.

If the drafting system is for drafting a shaped object such as a gear, a tool, a part, or the like, the drafting system typically provides a "pallet" of drawing elements, including lines, arcs, circles, rectangles, and the like. Accordingly, the shaped object is constructed or drafted from a number of such drawing elements, where the drafter selectively chooses and interconnects multiple numbers of dimensioned drawing elements to form the shaped object. For example, a draftsperson may construct a box-like object from a number of line elements, each line element having a selected length and position and being interconnected to at least one other line element. Correspondingly, a draftsperson may construct a cylindrical object to include a number of circle elements and/or arc elements in combination with a number of line elements.

As is known, the drawing field may extend beyond the confines of the computer view screen such that only a portion of the drawing field is displayed on the computer view screen. Typically, the drawing field is defined according to a universal coordinate system such that the drawing field has a single origin and each point in the drawing field has a unique coordinate. Typically, the coordinate system is rectangular, although the coordinate system may also be polar. Accordingly, a draftsperson can position each element in the drawing field according to the universal coordinate system.

However, a problem exists in that the universal coordinate system is cumbersome and requires a draftsperson to perform many running mathematical calculations. For example, if a draftsperson wishes to place a line to begin at an X-Y coordinate (x1, y1), where the line extends two units in the X direction and three units in the Y direction, a draftsperson must remember that one end point of the line is at coordinate (x1, y1), and must mentally calculate that the other end point must be positioned at coordinate (x1+2, y1+3). As should certainly be evident, such a process is time consuming and prone to error. Moreover, such an X-Y coordinate system does not easily facilitate placing an element that has a particular angular requirement.

A need exists, then, for a method for drawing an element of an object during computer-aided drafting of the object, where each element is drawn with respect to the origin of a movable drawing plane.

SUMMARY OF THE INVENTION

The aforementioned need is satisfied by a method for drawing an element of an object during computer-aided drafting of the object with a computer having a view screen displaying a cursor and at least a portion of a drawing field. The computer also has a cursor manipulator. In the method, the cursor is positioned using the cursor manipulator at a first location on the drawing field, a first data point is recorded at the first location, and the first data point is displayed on the view screen.

A drawing plane is associated with the first data point and has a first axis, a second axis substantially perpendicular to the first axis, and an origin at the intersection of the first and second axes. The origin coincides with the first data point. The cursor is then positioned using the cursor manipulator at a second location on the drawing field relative to the origin of the drawing plane, a second data point is recorded at the second location, and the second data point is displayed on the view screen. At least a portion of the element is then displayed on the view screen where the element is at least partially defined by the first data point and the second data point.

BRIEF DESCRIPTION OF THE DRAWINGS

The foregoing summary as well as the following detailed description of the preferred embodiment of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings;

FIG. 1 illustrates an example of drawing a line element in accordance with the method of the present invention, and shows a drawing plane symbol representative of a drawing plane, a cursor, and a tentative line element extending from the origin of the drawing plane to the cursor;

FIG. 2A illustrates the selection of an end point for the line element of FIG. 1;

FIG. 2B illustrates the drawing of a second line element extending from the first line element shown in FIG. 2A;

FIG. 2C illustrates the drawing of a circle element centered on the end point of the first line element shown in FIG. 2B;

FIG. 3 illustrates the rotation of the drawing plane according to the cursor shown in FIG. 1;

FIG. 4 illustrates the drawing of a line element with the drawing plane of the method of the present invention, where the line element has been restricted to the Y-axis of the drawing plane;

FIG. 5 illustrates the drawing of a line element with the drawing plane of the method of the present invention, where the line element has been restricted to a selected angle with respect to the drawing plane;

FIG. 6 illustrates the drawing of a line element with the drawing plane of the method of the present invention, where the length of the line element has been restricted to a pre-selected radial distance with respect to the origin of the drawing plane;

FIGS. 7A–7B illustrate the rotation of the view with respect to the Y-axis of the drawing plane of the method of the present invention;

FIG. 8 illustrates the drawing plane symbol and drawing plane of FIG. 1 in more detail;

FIG. 9 illustrates a typical computer system employed to perform the method of the present invention.

DETAILED DESCRIPTION OF PREFERRED EMBODIMENT

Figure 10:
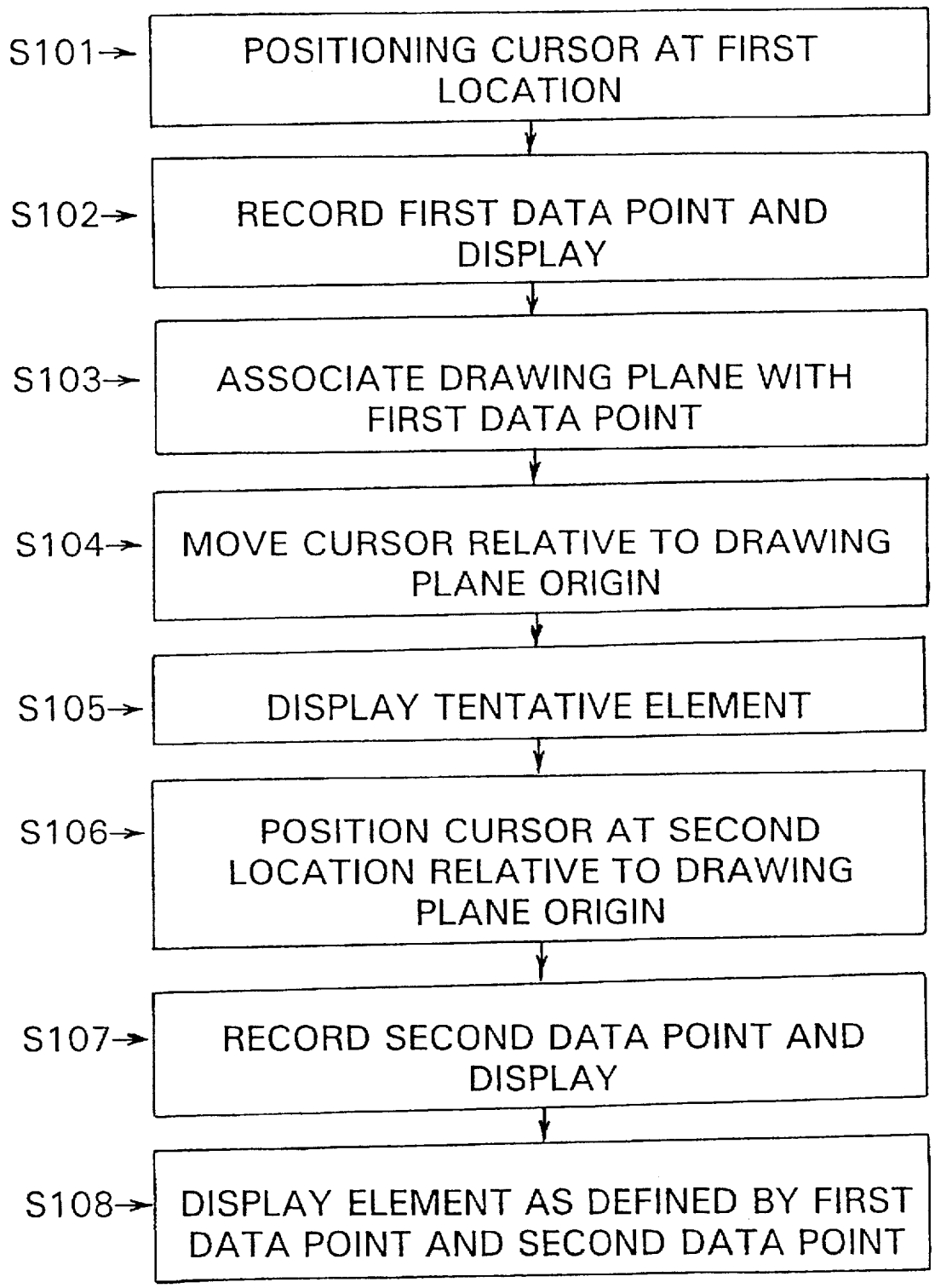
FIG. 10 is a flow diagram showing the method performed in the preferred embodiment of the present invention.

Certain terminology may be used in the following description for convenience only and is not limiting. The words "left", "right", "upper", and "lower" designate directions in the drawings to which reference is made. The words "inwardly" and "outwardly" are further directions toward and away from, respectively, the geometric center of a referenced object. The terminology includes the words above specifically mentioned, derivatives thereof, and words of similar import.

Referring to the drawings in detail, wherein like numerals are used to indicate like elements throughout, there is shown in FIG. 10 and beginning with FIG. 1 a method for drawing an element 10a of an object during computer-aided drafting of the object in accordance with a preferred embodiment of the present invention. As should be understood, in the method of the preferred embodiment of the present invention, the term "draw" with respect to an object and derivatives thereof is to be interpreted to include drawing, modifying, editing, changing, and the like.

As should be understood, and referring now to FIG. 9, the element 10a is drawn with the aid of a computer system 12 having a view screen 14 displaying a cursor 16 (shown as an "x" in FIG. 1) and at least a portion of a drawing field 18. As one skilled in the art will appreciate, the computer system 12 may be any properly configured computer system without departing from the spirit and scope of the present invention. For example, the computer system 12 may be a PC-based computer system, a local area network-based computing system, a wide area network-based computing system, a main frame-based computer system, or the like.

Preferably, the computer system 12 includes a computer-aided drafting software system. As with the computer system 12, any computer-aided drafting software system may be employed without departing from the spirit and scope of the present invention. For example, the computer-aided drafting software system may be the BENTLEY MICROSTATION system.

As seen in FIG. 9, the computer system 12 includes a cursor manipulator 20 for manipulating the position of the cursor 16 on the view screen 14 and drawing field 18. As should be recognized, the cursor manipulator 20 may be any appropriate device without departing from the spirit and scope of the present invention. For example, the cursor manipulator may be a computer mouse, a computer joystick, or the directional arrow keys on a keyboard 22 attached to the computer system 12. Preferably, the drafting system includes appropriate means for shifting the drawing field 18 with respect to the view screen 14 such that every portion of the drawing field 18 is viewable on the view screen 14, although not necessarily at the same time.

Referring again to FIGS. 1 and 10, in the method of the present invention, the cursor 16 is first positioned using the cursor manipulator 20 at a first location 24a on the drawing field 18 (step S101), and a first data point is recorded at the first location 24a (step S102). As seen in FIG. 1, the recorded first data point 24a is displayed on the view screen 14, and a drawing plane is associated with the first data point 24a (step S103).

More particularly, and as shown in FIG. 8, the drawing plane is represented by a drawing plane symbol 26r, and the drawing plane has a first axis 28a, a second axis 28b substantially perpendicular to the first axis 28a, and an origin 30 at the intersection of the first and second axes 28a, 28b. As seen in FIG. 1, the drawing plane is associated with the first data point 24a such that the origin 30 coincides with the first data point 24a. With such association, then a next data point may be defined directly in relationship to the first data point 24a.

As seen in FIGS. 1 and 8, the drawing plane symbol 26r is generally square or rectangular and includes hash marks representative of the axes 28a, 28b. However, one skilled in the art will recognize that the drawing plane symbol 26r may have any appropriate design as long as such design does not hinder a draftsperson in placing the next data point in relationship to the first data point 24a. As seen in FIG. 1, the drawing plane symbol 26r may be accompanied on the view screen 14 by a coordinate box 32 or the like showing the present position of the cursor 16 with respect to the origin 30 of the drawing plane. In FIG. 1, the coordinate box 32 expresses the position of the cursor 16 in terms of rectangular (X-Y) coordinates.

Preferably, the coordinate box 32 is continuously and near-instantaneously updated, even when the cursor 16 is moved using the cursor manipulator 20 through a plurality of intermediate locations 24i on the drawing field 18 relative to the origin 30 of the drawing plane (step S104). Preferably, each intermediate location 24i defines a tentative data point, where each tentative data point 24i is defined with respect to the origin 30 of the drawing plane. Also preferably, as the cursor 16 is moved through the plurality of intermediate locations 24i, at least a portion of the element 10a is displayed on the view screen 14 as a tentative element (step S105), where the element 10a is at least partially defined by the first data point 24a and the tentative data point 24i. As seen in FIG. 1, the element 10a is a line element and is dashed to show that the line element is tentative. Accordingly, as a draftsperson moves the cursor 16 with respect to the origin 30 at the first data point 24a, the tentative element 10a is moved to extend between the first data point 24a and the cursor 16.

As shown in FIG. 2A, then, a draftsperson can position the cursor 16 using the cursor manipulator 20 at a second location 24b on the drawing field relative to the origin 30 of the drawing plane (step S106), and can record a second data point at the second location 24b (step S107). Since the element 10a is a line element which is fully defined by the first data point 24a and the second data point 24b, the fully defined line element 10a is preferably displayed as a solid line extending between the data points 24a, 24b (step S108).

As seen in FIG. 2A, the recorded second data point 24b is displayed on the view screen 14, and the drawing plane symbol 26r is moved to represent the movement of the origin 30 and first and second axes 28a, 28b and of the drawing plane from the first data point 24a to the second data point 24b. Accordingly, a third data point may be located at a third location (not shown in FIG. 2A) with respect to the origin 30 of the drawing plane as it is situated to coincide with the second data point 24b.

As should be understood, and referring now to FIG. 2B, to position the third data point, steps S101–S108 are generally repeated, although with respect to the second data point 24b as the origin 30 of the drawing plane. Specifically, the cursor 16 is moved using the cursor manipulator 20 from the second data point 24b through a plurality of intermediate locations on the drawing field 18 relative to the origin 30 of the drawing plane, where each intermediate location 24i defines a tentative data point with respect to the origin 30 of the drawing plane at the second data point 24b. During such movement, a second element 10b (a line element) is tentatively displayed as extending between the second data point 24b and the cursor 16, as shown by the dashed line in FIG. 2B.

Accordingly, a draftsperson may position the cursor 16 using the cursor manipulator 20 at a third location 24c of a drawing field 18 relative the origin 30 of the drawing plane, and record a third data point at the third location 24c, as seen in FIG. 2C. As a result, a line element 10b is fully defined by the second data point 24b and the third data point 24c, and is shown in solid in FIG. 2C.

As may be noticed, the drawing plane in FIGS. 2B and 2C is represented by a drawing plane symbol 26p that is generally circular in shape, and the coordinate box 32 displays the position of the cursor 16 with respect to the origin 30 of the drawing plane in terms of polar (R-θ) coordinates. As should be understood, with such a polar coordinate system, a draftsperson may precisely place the element 10b at a pre-selected angle by referring only to the coordinate box 32.

Preferably, then, the drawing plane coordinate system is freely switchable between a rectangular coordinate system, as represented by the drawing plane symbol 26r shown in FIG. 2A, and a polar coordinate system, as represented by the drawing plane symbol 26p shown in FIG. 2B. Preferably, a draftsperson switches between the rectangular coordinate system and the polar coordinate system upon an affirmative determination to do so by way of a keyboard command on the keyboard 22 or the like.

As should be recognized, certain drawing elements require more then two data points to be fully defined. For example, an arc element (not shown) requires a center data point and two end data points to be fully defined. In such case it is preferable that the center data point be positioned first and that the end data points be positioned second and third. Moreover, since both end points are preferably positioned with respect to the center data point, it is preferable that the drawing plane be maintained at the center data point after the first of the two end points has been recorded. Preferably, the computer system 12 and the computer-aided drafting software system are context-sensitive and perform such drawing plane maintenance automatically.

Also preferably, a draftsperson has the option of affirmatively selectively maintaining the drawing plane at one data point after another data point has been recorded relative to the one data point. Accordingly, and as seen in FIG. 2C, even though the third data point has been recorded at the third location 24c, the drawing plane symbol 26p may still be maintained at the second data point 24b such that the position of the cursor 16 is shown in the coordinate box 32 with respect to the origin 30 that coincides with the second data point 24b.

As should now be understood, with the method of the present invention, any element may be drawn such that a second data point of the element is drawn with respect to a first data point of the element, and such that a third data point (if necessary) of the element can be drawn with respect to the first data point or the second data point. For example, and referring again to FIG. 2C, a circle element 10c may be drawn by defining the center point as one data point and then by defining the radius using another data point. Note that as shown in FIG. 2C, the circle element 10c is tentative as shown by being dashed, the center point is the second data point 24b, and the radius is tentatively defined at the tentative data point 24i.

Preferably, the first and second axes 28a, 28b of the drawing plane are by default orthogonally aligned with the drawing field 18, as seen in FIGS. 1–2C. However, it is also preferable that a draftsperson be able to affirmatively selectively rotate the drawing plane on the origin 30 thereof, as seen in FIG. 3. To do so, it is preferable that while moving the cursor 16 through a plurality of tentative data points 24i on the drawing field 18, a draftsperson may affirmatively selectively determine that a tentative data point 24i is to be a rotated axis point 24r.

Upon such determination, the drawing plane and drawing plane symbol 26r are rotated on the origin 30 thereof such that the first axis 28a of the rotated drawing plane intersects with the rotated axis point 24r. As seen in FIG. 3, the first axis 28a is the X-axis since the Y-coordinate in the coordinate box 32 is shown as zero. However, one skilled in the art will also recognize that the first axis 28a may instead be the Y-axis without departing from the spirit and scope of the present invention.

As one skilled in the art will recognize, a draftsperson will often find it useful to restrict the tentative data points 24i and second data point 24b to selected locations with respect to the drawing plane and/or the origin 30 thereof. For example, while drawing a line element 10a, a draftsperson may wish to restrict or 'lock' the line element 10a to one of the axes 28a, 28b of the drawing plane, as seen in FIG. 4; to a predetermined angle (θ-coordinate) with respect to the drawing plane, as seen in FIG. 5; or to a pre-selected length (R-coordinate), as seen in FIG. 6. In each of the aforementioned situations, it is preferable that a draftsperson manually enter an appropriate 'lock'-type command by way of the keyboard 22 (as seen in FIG. 9). Preferably, any 'lock' command may be undone by an appropriate 'unlock' command.

With respect to 'locking' the line element 10a to one of the axes 28a, 28b (FIG. 4), it is preferable that the axis 28a, 28b be automatically selected based upon proximity to the cursor 16 and the current tentative data point 24i, and also that such axis 28a, 28b be manually enterable by way of the keyboard 22. With respect to 'locking' the line element 10a to a predetermined angle (FIG. 5) or to a pre-selected length (FIG. 6), it is preferable that such angle or length be determinable based upon the cursor 16 and the current tentative data point 24i, and also that such angle or length be manually enterable by way of the keyboard 22.

Preferably, a draftsperson may also manually enter a non-zero X- or Y-coordinate by way of the keyboard 22 and thereby 'lock' the cursor 16 and 24i with respect to that coordinate (not shown). Also preferably, the non-zero X- or Y-coordinate is automatically signed based on the current position of the cursor 16 and the current tentative data point 24i. For example, if the cursor is in the negative Y half of the drawing plane, an entered Y-coordinate is automatically signed negative. As one skilled in the art will recognize, other entry means may be employed to enter 'lock' information without departing from the spirit and scope of the present invention. One skilled in the art will also recognize that restricting or 'locking' is not limited to a line element, but can be performed while drawing any other element 10 as well.

Although in each of FIGS. 4–6 the tentative data points 24i and the second data point 24b have been restricted or 'locked' with respect to at least one coordinate, one skilled in the art will appreciate that the cursor 16 need not necessarily also be restricted or 'locked'. Accordingly, and as seen in FIG. 4, although the cursor 16 is positioned off the restricted tentative line element 10a, the Y-coordinate of the position of the cursor 16 is employed as the Y-coordinate of the restricted tentative data point 24i, as represented by the dotted horizontal line 34 that extends between the cursor 16 and the tentative data point 24i.

Similarly, in FIG. 5, the R-coordinate of the position of the cursor 16 determines the R-coordinate of the angularly restricted tentative data point 24i, as represented by the dotted arc line 34 between the cursor 16 and the intermediate location 24i. Likewise, in FIG. 6, the θ-coordinate of the position of the cursor 16 determines the θ-coordinate of the radially restricted tentative data point 24i, although no dotted line is shown since the cursor 16 is at a radial position closer to the origin 30 than the pre-selected radial coordinate and is therefore 'on top of' the tentative line element 10a.

As should be evident, most if not all objects are three-dimensional and are drawn by a draftsperson in a three-dimensional drawing field 18, while the drawing plane represented by the drawing plane symbol 26r, 26p is two-dimensional. Accordingly, when the three-dimensional object in the three-dimensional drawing field 18 is viewed on a two-dimensional view screen 14, one of the dimensions must be 'compressed'. Preferably, the method of the present invention allows for the rotation of the view of the object with respect to the first or second axes 28a, 28b of the drawing plane such that the 'compressed' dimension is 'expanded'.

For example, and as seen in FIG. 7A, an object appears to have only a single line element 10a when viewed in an X-Y drawing plane with the Z-dimension compressed. Preferably, once a draftsperson affirmatively selectively determines that the view of the object is to be rotated with respect to the first axis 28a of the drawing plane, the view and drawing plane are so rotated. Accordingly, and as seen in FIG. 7B, the object is viewed in the Y-Z drawing plane with the X-dimension compressed and it is revealed that the object also has a line element 10b that extends in parallel with the Z-axis and that was not seen when the object was viewed in the X-Y drawing plane with the Z-dimension compressed (FIG. 7A).

Preferably, the drawing plane may be rotated with respect to the first or second axis 28a, 28b thereof. As should be understood, then, the drawing plane may be rotated multiple numbers of times on the axes 28a, 28b in order that a draftsperson can move from, for example, a top view to a bottom view or a left view to a right view. As one skilled in the art will recognize, the amount of rotation may be other than ninety degrees without departing from the spirit and scope of the present invention. For example, a draftsperson may decide to rotate the drawing plane forty-five degrees with respect to the first axis 28a thereof, and then sixty degrees with respect to the second axis 28b thereof.

An example of computer source code that implements the method of the present invention is listed in the Appendix, which is hereby incorporated by reference. One skilled in the art will recognize, however, that other examples of source code may be employed with equal effect, and that the invention is not limited to the particular computer source code listed in the Appendix.

From the foregoing description, it can be seen that the present invention comprises a new and useful method for drawing an element of an object during computer-aided drafting of the object. The method is particularly useful since the element is drawn with respect to a more relevant drawing plane origin rather than with respect to a less relevant universal coordinate system and is therefore easier to use and more accurate. Moreover, the method allows for the precise placement of points based either on rectangular coordinates or polar coordinates. It will be appreciated by those skilled in the art that changes could be made to the embodiment described above without departing from the broad inventive concepts thereof. It is understood, therefore, that this invention is not limited to the particular embodiment disclosed but is intended to cover modifications within the spirit and scope of the present invention as defined by the appended claims.

I claim:

1. A method for drawing an element of an object during computer-aided drafting of the object with a computer having a view screen displaying a cursor and at least a portion of a drawing field, the computer also having a cursor manipulator, the method comprising the steps of:

positioning the cursor using the cursor manipulator at a first location on the drawing field;

recording a first data point at the first location and displaying the first data point on the view screen;

associating with the first data point a drawing plane having a first axis, a second axis substantially perpendicular to the first axis, and an origin at the intersection of the first and second axes, the origin coinciding with the first data point;

positioning the cursor using the cursor manipulator at a second location on the drawing field relative to the origin of the drawing plane;

recording a second data point at the second location and displaying the second data point on the view screen; and displaying on the view screen at least a portion of the element, the element being at least partially defined by the first data point and the second data point.

2. The method of claim 1 wherein the step of positioning the cursor at a second location further comprises the steps of:

moving the cursor using the cursor manipulator through a plurality of intermediate locations on the drawing field relative to the origin of the drawing plane, each intermediate location defining a tentative data point, each tentative data point being defined with respect to the origin of the drawing plane; and displaying on the view screen for each of at least some of the tentative data points at least a portion of the element as the cursor is moved through the plurality of intermediate locations, the element being at least partially defined by the first data point and the tentative data point.

3. The method of claim 1 wherein the associating step further comprises the step of displaying on the view screen a drawing plane symbol representative of the drawing plane, the first axis, the second axis, and the origin.

4. The method of claim 1 wherein the element is a line having first and second ends, the first and second data points defining the first and second ends.

5. The method of claim 1 wherein the element is a circle having a center point and a radius, the first and second data points defining the center point and the radius.

6. The method of claim 1 wherein the step of positioning the cursor at a second location further comprises the steps of:

moving the cursor using the cursor manipulator through a plurality of intermediate locations on the drawing field relative to the origin of the drawing plane, each intermediate location defining a tentative data point, each tentative data point being defined with respect to the origin of the drawing plane; and displaying each of at least some of the tentative data points and the second data point relative to the origin of the drawing plane according to a coordinate system selected from the group consisting of a rectangular coordinate system and a polar coordinate system.

7. The method of claim 6 further comprising the step of affirmatively switching between the rectangular coordinate system and the polar coordinate system.

8. The method of claim 1 further comprising the step of moving the drawing plane after the second data point has been recorded such that the origin of the drawing plane coincides with the second data point.

9. The method of claim 1 further comprising the step of maintaining the drawing plane after the second data point has been recorded such that the origin of the drawing plane still coincides with the first data point.

10. The method of claim 1 further comprising the step of affirmatively restricting the second data point to one of the first and second axes of the drawing plane.

11. The method of claim 10 wherein the step of affirmatively restricting further comprises restricting the second data point to the axis more proximate the cursor upon entry of an axis restrict command.

12. The method of claim 1 further comprising the step of affirmatively restricting the second data point to a predetermined radius with respect to the origin.

13. The method of claim 1 further comprising the step of affirmatively restricting the second data point to a predetermined angular position with respect to the drawing plane.

14. The method of claim 1 wherein the step of positioning the cursor at a second location further comprises the steps of:

moving the cursor using the cursor manipulator through a plurality of intermediate locations on the drawing field relative to the origin of the drawing plane, each intermediate location defining a tentative data point, each tentative data point being defined with respect to the origin of the drawing plane;

affirmatively determining that a tentative data point is a rotated axis point; and rotating the drawing plane on the origin thereof such that the first axis of the rotated drawing plane intersects with the rotated axis point.

15. The method of claim 1 wherein the object is three-dimensional and is viewed on the view screen in a first view, and wherein the drawing plane is two-dimensional, the method further comprising the steps of:

affirmatively determining that the drawing plane is to be rotated with respect to the first axis thereof; and rotating the drawing plane with respect to the first axis thereof such that the object is viewed on the view screen in a second view.

* * * * *